United States Patent
Sekine et al.

(10) Patent No.: US 6,806,917 B2
(45) Date of Patent: Oct. 19, 2004

(54) ACTIVE MATRIX TYPE LIQUID CRYSTAL DISPLAY DEVICE

(75) Inventors: Hiroyuki Sekine, Tokyo (JP); Kazuhide Yoshinaga, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 230 days.

(21) Appl. No.: 10/003,306

(22) Filed: Dec. 6, 2001

(65) Prior Publication Data

US 2002/0071073 A1 Jun. 13, 2002

(30) Foreign Application Priority Data

Dec. 7, 2000 (JP) ........................................ 2000-372938

(51) Int. Cl.[7] .............................................. G02F 1/136
(52) U.S. Cl. ............................. 349/43; 349/42; 257/59; 257/72
(58) Field of Search ....................... 349/43, 44; 257/52, 257/72

(56) References Cited

U.S. PATENT DOCUMENTS

| | | | | |
|---|---|---|---|---|
| 5,317,432 A | * | 5/1994 | Ino | 349/39 |
| 5,377,031 A | * | 12/1994 | Vu et al. | 349/45 |
| 5,583,676 A | * | 12/1996 | Akiyama et al. | 349/28 |
| 6,038,004 A | * | 3/2000 | Nanno et al. | 349/44 |
| 6,052,165 A | * | 4/2000 | Janssen | 349/84 |
| 6,473,145 B1 | * | 10/2002 | Shim et al. | 349/113 |
| 6,528,822 B2 | * | 3/2003 | Murade | 257/72 |

FOREIGN PATENT DOCUMENTS

| | | |
|---|---|---|
| JP | 9-80476 | 3/1997 |
| JP | 10-153798 | * 6/1998 |
| JP | 2000-164875 | 6/2000 |
| JP | 2000-164882 | * 6/2000 |
| JP | 2002-110998 | * 4/2002 |

* cited by examiner

Primary Examiner—Nathan J. Flynn
Assistant Examiner—Ahmed N. Sefer
(74) Attorney, Agent, or Firm—Young & Thompson

(57) ABSTRACT

In an active matrix type liquid crystal display device having a structure in which a pixel TFT is disposed in a trench carved in a substrate; with a section which is not carved in but left hill-shaped being present in the vicinity of the TFT, an underneath light-shielding film 4 disposed beneath a semiconductor layer 7 of the TFT is formed so as to reach at least the top of the hill-shaped section 2a; and a metal electrode layer 9 formed above the semiconductor layer of the TFT extends to the top of the hill-shaped section 2a; and besides, on the top of the hill-shaped section, a film thickness of an interlayer insulating film (5, 8) laid between the underneath light-shielding film 4 and metal electrode layer 9 is made thinner than in other sections thereof.

5 Claims, 14 Drawing Sheets

ACTIVE MATRIX TYPE LIQUID CRYSTAL DISPLAY DEVICE

BACKGROUND OF THE INVENTION

1. Field of the Invention

The present invention relates to a pixel structure in a liquid crystal display device, such as a liquid crystal projector, and more particularly to improvements in light-shielding capability of an active matrix type liquid crystal display device for a light valve wherein switching of a liquid crystal is carried out through a thin film transistor (TFT). Further, the present invention relates to a manufacturing method thereof.

2. Description of the Related Art

In recent years, as a display for the wall-hanging type television, the projective-type television or the OA appliances, various display units using a liquid crystal panel have been developed. Among those liquid crystal panels, an active matrix type liquid crystal display wherein TFTs are included as the active element in a liquid crystal display device is the most promising to realize a high quality display unit for the OA appliances as well as a display unit for the high definition television because of its advantageous natures such as the one that an increase in number of scanning lines therein does not result in a deterioration of the contrast or the response time thereof. Especially when applied to a projection type liquid crystal display with the liquid crystal projection or the like, it allows achieving a large screen display with ease.

Normally, in the active matrix type liquid crystal display device for a light valve that is utilized for the liquid crystal projection, a small element is irradiated with a strong light, and the light passing therethrough is controlled according to the image data by turning on and off each pixel separately through switching of a liquid crystal by a corresponding TFT, and then the transmitted light, being magnified by an optical element such as a lens or the like, is projected on a screen or the like. At this, if an active layer of the TFTs formed from polysilicon (p-si), there may be produced the leakage current in a channel section of the TFT at the off-time, due to the photo excitation, by the reflected light from the optical system such as a lens, not to mention under the direct influence of the incident light thereon, and brought about a problem of display quality such as cross-talk.

The present assignee have so far put forward several methods of preventing the light from entering into the channel section of the TFT. For example, in Japanese Patent Application Laid-open No. 80476/1997, it is disclosed that, by setting a light-shielding film beneath a TFT, that is, on the opposite side to the incident light from the light source, a reflected ray from the optical system can be prevented from entering into the TFT, while, by forming a section of rough surface on the substrate surface over which the light-shielding film is formed, a reflected ray entering through a section where no light-shielding film is formed can be made to make diffused reflection within the substrate and, thus, prevented from entering into the TFT.

Further, in Japanese Patent Application Laid-open No. 164875/2000, there is described a structure wherein a recess section is formed in a substrate, and, in the recess section, a light-shielding film is formed, and, within that recess section covered with the light-shielding film, a channel section of a TFT is formed, whereby the reflected light can be prevented from entering thereto.

FIG. 25(a) is a schematic partial plan view and FIG. 25(b) is a schematic cross-sectional view taken along the line G–G' of FIG. 25(a) for a liquid crystal display device in process of manufacture according to Japanese Patent Application Laid-open No. 164875/2000.

In the drawings, referential numeral 1 indicates a transparent insulating substrate such as a glass substrate, and on an inner wall of a recess section (trench) set within an underlying insulating film 2 on the substrate, an underneath light-shielding film 4 is formed from WSi or the like. Covering the underneath light-shielding film 4, a first interlayer film 5 is formed over the substrate, and, in a section surrounded with the afore-mentioned underneath light-shielding film 4, a semiconductor layer 7 that is to serve as a channel layer of a TFT is formed from polysilicon, and over that semiconductor layer 7, a gate insulating film 8 and a gate line 9 are successively formed. Such a structure can considerably cut off the incidence of the reflected light from the optical system and improve the display quality. Further, this structure may reduce, with effect, the unevenness resulting from the overlapping of the layered films.

However, the first interlayer film 5 that is to be formed on the underneath light-shielding film 4 is set to have a considerably large film thickness, for the purpose of protecting the semiconductor layer 7 made of polysilicon from contamination and besides, if a conductive material such as WSi is utilized for the underneath light-shielding film 4, with an object of preventing the underneath light-shielding film to act as a back-gate. In consequence, as shown in the drawing, the light, although in a small amount, may enter from a gap between the underneath light-shielding film 4 and the gate line 9, and then this incident light may reach the semiconductor layer 7, making diffused reflection within the first interlayer film 5 and give rise to the leakage current, which causes the lowering of the image quality.

SUMMARY OF THE INVENTION

Accordingly, an object of the present invention is to provide an active matrix type liquid crystal display device having a structure in which a pixel TFT is disposed in a trench set in a substrate thereof with an arrangement to prevent an incident ray of light which enters from an edge section of an underneath light-shielding film from reaching a semiconductor layer of the pixel TFT.

In light of the above problems, the present inventors conducted investigations and reached the present invention by finding out that the light can be blocked from traveling in for certain, if, when forming a trench in the afore-mentioned substrate, a hill-shaped section is left in the vicinity of the pixel TFT, without being carved in, and the underneath light-shielding film extends to the top of said hill-shaped section, and a portion of the interlayer film formed on said underneath light-shielding film, which lies on said hill-shaped section, is made thin, and thereby a distance between a metal interconnection layer such as a gate line that is to be formed in the later steps and the underneath light-shielding film is made substantially narrow.

Accordingly, the present invention relates to (1) an active matrix type liquid crystal display device having a structure in which a pixel TFT is disposed in a trench carved in a substrate; wherein with a section which is not carved in but left hill-shaped being present in the vicinity of the TFT, an underneath light-shielding film disposed beneath a semiconductor layer of the TFT is formed so as to reach at least the top of said hill-shaped section; and a metal electrode layer formed above the semiconductor layer of the TFT extended to the top of said hill-shaped section; and besides, on the top of said hill-shaped section, a film thickness of an interlayer insulating film laid between said underneath light-shielding film and metal electrode layer is made thinner than in other sections thereof.

Further, the present invention relates to (2) a liquid crystal display device as set forth in (1), wherein the interlayer insulating film laid between said underneath light-shielding film and metal electrode layer comprises a first interlayer film formed between the underneath light-shielding film and the semiconductor layer as well as a gate insulating film formed between the semiconductor layer and the metal electrode layer; and, on the top of said hill-shaped section, at least a part of said first interlayer film in the direction of the thickness is etched away.

Further, the present invention relates to (3) a liquid crystal display device as set forth in (2), wherein, after said first interlayer film is removed to expose the light-shielding metal film on the top of said hill-shaped section, a second interlayer film which is thinner than said first interlayer film is formed, and thereafter the gate insulating film is formed.

Further, the present invention relates to (4) a liquid crystal display device as set forth in one of items (1)–(3), wherein said hill-shaped section is formed so as to enclose the TFT.

Further, the present invention relates to (5) a liquid crystal display device as set forth in one of items (1)–(3), wherein said hill-shaped section is formed on either side of a region where the semiconductor layer of the TFT is formed in the direction parallel to a gate line so that said region may become groove-shaped.

Further, the present invention relates to (6) a liquid crystal display device as set forth in (4) or (5), wherein a portion of said semiconductor layer of the TFT constitutes a storage capacitor section and the interlayer film laid between the semiconductor layer and the underneath light-shielding film in said storage capacitor section is made thinner than in the TFT section.

Further, the present invention relates to (7) a manufacturing method of an active matrix type liquid crystal display device having a structure in which a pixel TFT is disposed in a trench carved in a substrate; which comprises the steps of:

growing an underlying insulating film on a transparent insulating substrate;

forming a trench for disposing a pixel TFT by etching said underlying insulating film;

forming an underneath light-shielding film on an inner wall of said trench;

forming on the entire surface of the substrate, a first interlayer film to cover said underneath light-shielding film;

forming a semiconductor layer in said trench; and forming a gate insulating film and then a metal electrode layer on said semiconductor layer; wherein in forming said trench, a section which is not carved in but left hill-shaped is formed in the vicinity of the TFT, and the underneath light-shielding film disposed beneath the semiconductor layer of the TFT is formed so as to reach at least the top of said hill-shaped section; and the metal electrode layer formed above the semiconductor layer of the TFT extends to the top of said hill-shaped section; and which further comprises the step of:

etching away, in the direction of the film thickness, at least a part of an interlayer insulating film laid between said underneath light-shielding film and metal electrode layer so as to make a film thickness of the interlayer insulating film on the top of said hill-shaped section thinner than in other sections.

Further, the present invention relates to (8) a manufacturing method as set forth in (7), wherein, after the first interlayer film on the top of said hill-shaped section is removed to expose the underneath light-shielding metal film, a second interlayer film which is thinner than said first interlayer film is formed over the entire surface, and thereafter the semiconductor layer is formed on said second interlayer film.

Further, the present invention relates to (9) a manufacturing method asset for thin (7)or (8), wherein said hill-shaped section is formed so as to enclose the TFT.

Further, the present invention relates to

(10) a manufacturing method asset for thin (7) or (8), wherein said hill-shaped section is formed on either side of a region where the semiconductor layer of the TFT is formed in the direction parallel to a gate line so that said region may become groove-shaped.

Further, the present invention relates to

(11) a manufacturing method asset for thin (9) or (10), wherein a portion of said semiconductor layer of the TFT constitute a storage capacitor section, which further comprises the step of making, in the direction of the film thickness, at least a part of the first interlayer film which is included in an interlayer film laid between the semiconductor layer and the underneath light-shielding film in said storage capacitor section thinner than in the TFT section.

Further, the present invention relates to

(12) a manufacturing method as set forth in (11), wherein the step of making the first interlayer film in said storage capacitor section is carried out concurrently with etching of the top of said hill-shaped section.

In the present invention, an underneath light-shielding film extends from a trench section where a semiconductor layer of a TFT is to be disposed to the top of a hill-shaped section formed to surround the trench, and, on the top of the hill-shaped section, a film thickness of an interlayer insulating film laid between the underneath light-shielding film and a metal electrode layer formed above the semiconductor layer of the TFT is made thinner that the one in other sections thereof, especially the one of an interlayer insulating film laid between the underneath light-shielding film and the semiconductor layer, and thereby the light traveling from the reverse of the substrate such as the reflected light from an optical system can be cut off sufficiently so that the incident light coming from the reverse may not reach a channel layer of the TFT or create the leakage current, which suppresses cross-talk or the like that may lower the display quality.

In addition, an interlayer film laid between the semiconductor layer of the storage capacitor section and the underneath light-shielding film may be made thinner and the section may be made to act as a storage capacitor, whereby an increase in capacitance may be attained.

Figure 1:
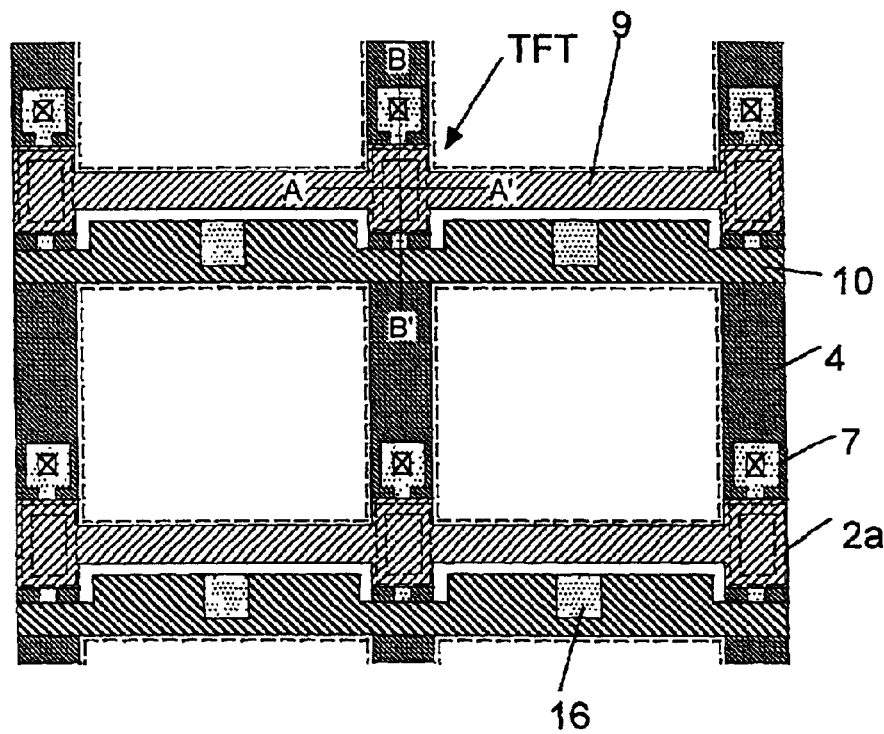
FIG. 1 is a schematic plan view of a pixel structure that is the first embodiment of the present invention.

Referential Numerals
1: Glass substrate
2: Underlying insulating film
  2a: Hill-shaped section
3, 6: Resist
4: Underneath light-shielding film
5: First interlayer film
7: Semiconductor layer (Polysilicon)
  7a: Channel section
  7b: LDD region
8: Gate insulating film
9: Gate line
10: Capacitor upper electrode
11: Second interlayer film
12: Third interlayer film
13: Data line
14: Fourth interlayer film
15: Black matrix
16: Contact section
17: Planarizing film
18: Pixel electrode (ITO)

DETAILED DESCRIPTION OF THE PREFERRED EMBODIMENTS

Figure 2:
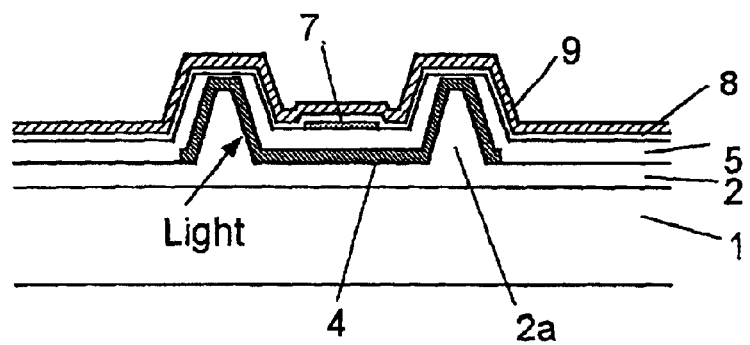
FIG. 2 is a schematic cross-sectional view of the pixel structure taken along the line A–A' of FIG. 1.
Figure 3:
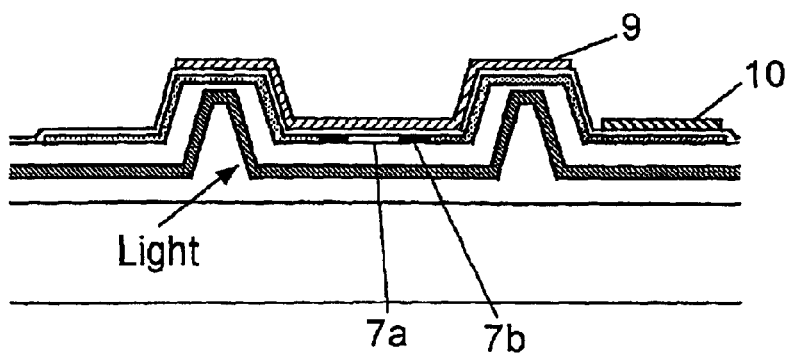
FIG. 3 is a schematic cross-sectional view of the pixel structure taken along the line B–B' of FIG. 1.

FIG. 1 is a schematic plan view showing a pixel structure in a liquid crystal display device that is the first embodiment of the present invention in process of manufacture. FIG. 2 and FIG. 3 are schematic cross-sectional views taken along the lines A–A' and B–B' in FIG. 1, respectively. Herein, an underlying insulating film 2 is formed on a transparent insulating substrate 1 such as glass substrate, and a hill-shaped section 2a is left so as to surround a semiconductor layer section of a TFT. An underneath light-shielding film 4 is formed to cover that hill-shaped section 2a, and over that underneath light-shielding film 4, a first interlayer film 5 is formed to a substantial thickness. On the first interlayer film 5, a semiconductor layer 7 is formed from polysilicon in such a way that a channel section of the TFT is disposed in the area surrounded by the hill-shaped section. That is, as shown in FIG. 3, the arrangement of the semiconductor layer 7 is such that both a channel section 7a and a LDD (Lightly-Doped Drain) region 7b are surrounded by the hill-shaped section 2a. Further, a gate line 9 is disposed thereon to overlie a gate insulating film 8. On the top of the afore-mentioned hill-shaped section 2a, the first interlayer film 5 is formed to be thinner than that in other sections, and, thus, the distance between the underneath light-shielding film 4 and the gate line 9 is shortened. As a result, the reflected light from the optical system or the like cannot pass through the top of the hill-shaped section so that the prevention of the light from traveling into the channel section of the TFT or suppression of the leakage current generation can be achieved with effect. Further, referential numeral 10, herein, indicates an upper electrode in a storage capacitor section and, in a portion thereof, an opening is made to form a contact section 16, enabling to bring out a contact with a pixel electrode in the later step.

Now, referring to FIG. 4–FIG. 10, a method of manufacturing such a structure is described below.

Figure 4:
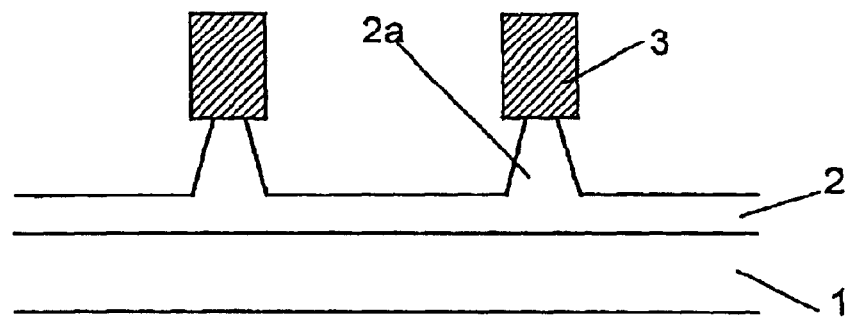
FIG. 4 is a schematic cross-sectional view in explaining the steps of a method of manufacturing the pixel structure of FIG. 1.

First, on a transparent insulating substrate 1 such as a glass substrate, there is grown an underlying insulating film 2. This underlying insulating film 2 is also to serve as a protection for the glass substrate against impurities so that it is preferably formed in such a way that its sections subjected to etching in a later step to be made thinner may still keep the thickness of 100 nm or more. As for the material of the underlying insulating film 2, from the viewpoint of the prevention of the impurity diffusion, a $SiO_2$ film is preferably employed. Further, with respect to the height of a hill-shaped section 2a, it is satisfactory if the top of the hill-shaped section including the film thickness of the underneath light-shielding film reaches at a higher level than a semiconductor layer 7 that is to be formed in a later step. Although the height thereof cannot be limited generally, as it varies with the number of metal layers that are to be laid, planarization in a later step considered, the hill-shaped section is formed, in this instance, to have a height of 1 $\mu$m or so. In order to leave the hill-shaped section 2a, as shown in FIG. 4, a resist 3 is disposed by means of photolithography on the hill-shaped section that is to be formed and then, by isotropic etching, the underlying insulating film 2 is etched to leave the hill-shaped section 2a. Hereat, if a pixel region is left together with the hill-shaped section, planarization in a later step may become more readily achieved.

Figure 5:
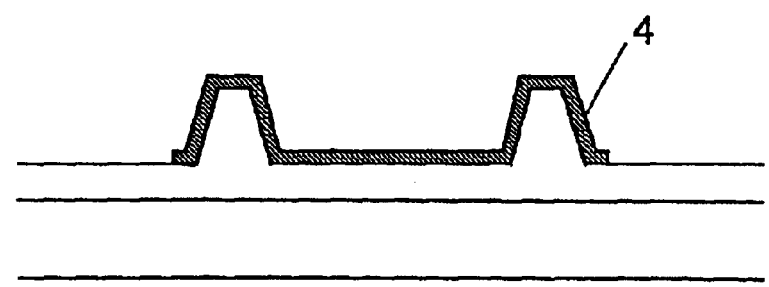
FIG. 5 is a schematic cross-sectional view in explaining the steps of the method of manufacturing the pixel structure of FIG. 1.

After the hill-shaped section 2a is formed in this way, an underneath light-shielding film 4 is formed (FIG. 5). The underneath light-shielding film 4, in itself, can be formed from any material that can cut off the reflected light coming from the side of the substrate. However, because annealing is performed at the time of polysilicon formation in a later step, the material that can stand heat, such as WSi, is employed. Regarding the film thickness of the underneath light-shielding film 4, if formed from WSi, a thickness not less than 100 nm is enough to provide the light-shielding effect, but a thickness not less than 160 nm is preferable. While the maximum for the thickness is not specifically set and can be appropriately chosen according to design, it is normally preferable that the thickness thereof does not exceed 500 nm or so. Hereat, the WSi film is formed to a thickness of 170 nm or so by the sputtering method, and then the patterning is applied thereto in the step of photolithography so that a trench section surrounded by a hill-shaped section 2a and a hill-shaped section 2a itself may be covered therewith.

Figure 6:
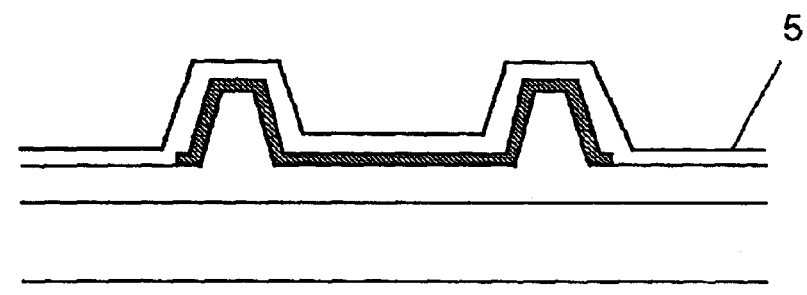
FIG. 6 is a schematic cross-sectional view in explaining the steps of the method of manufacturing the pixel structure of FIG. 1.

Next, as shown in FIG. 6, a first interlayer film 5 made of a $SiO_2$ film or the like is applied to the entire surface. In this instance, a $SiO_2$ film is formed by the PCVD (Plasma Chemical Vapor Deposition) method using TEOS (Tetra-Ethyl-Ortho-Silicate) as the material. A film thickness of the first interlayer film 5 is preferably set to be not less than 500 nm for the purpose of preventing impurities to come from the underneath light-shielding film 4 to a semiconductor layer that is to be formed on the first interlayer film from polysilicon, and besides, if the underneath light-shielding film 4 is formed from a conductive material such as WSi, with an object of preventing the underneath light-shielding film to act as a back-gate. Hereat, the film is formed to a thickness of 800 nm or so.

Figure 7:
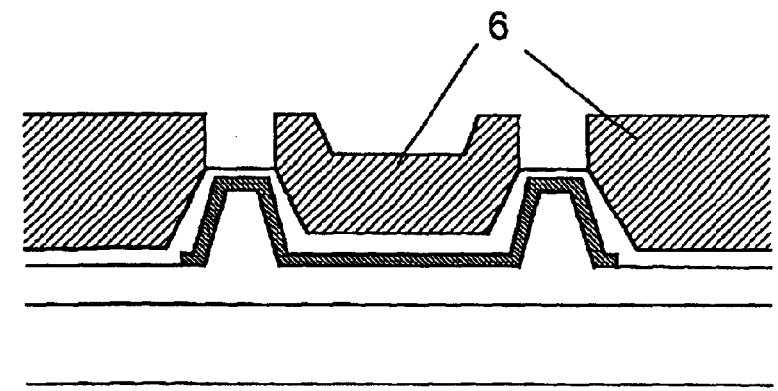
FIG. 7 is a schematic cross-sectional view in explaining the steps of the method of manufacturing the pixel structure of FIG. 1.
Figure 8:
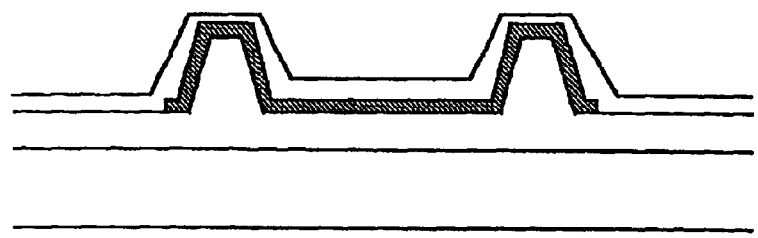
FIG. 8 is a schematic cross-sectional view in explaining the steps of the method of manufacturing the pixel structure of FIG. 1.

Following that, as shown in FIG. 7, a resist 6 is disposed in the form of a pattern to expose the first interlayer film 5 lying on the top of the hill-shaped section and a part of the first interlayer film 5 in the direction of the thickness is then etched. In this case, though an appropriate adjustment of the etching time period, the first interlayer film 5 is etched as much as to be left with a thickness of 100 nm or soon the top of the hill-shaped section. After that, the resist is removed (FIG. 8).

Figure 9:
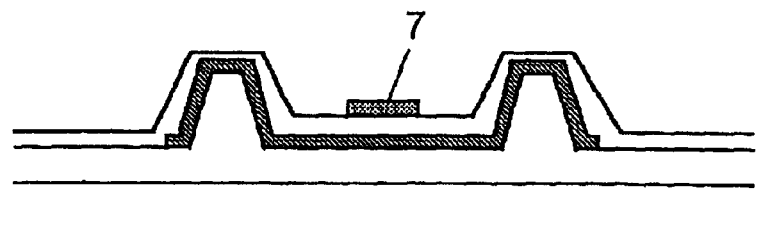
FIG. 9 is a schematic cross-sectional view in explaining the steps of the method of manufacturing the pixel structure of FIG. 1.
Figure 10:
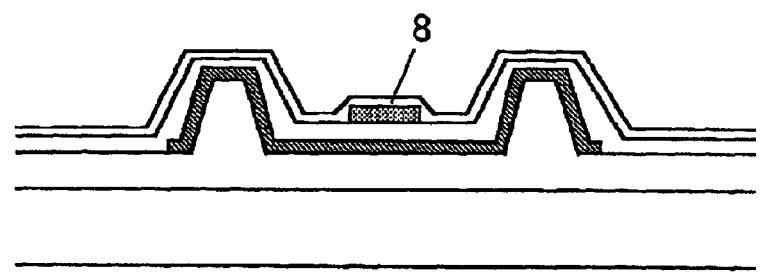
FIG. 10 is a schematic cross-sectional view in explaining the steps of the method of manufacturing the pixel structure of FIG. 1.

Now, a semiconductor layer 7 is formed from polysilicon into a prescribed shape around the center of a trench section surrounded with the afore-mentioned hill-shaped section (FIG. 9). Hereat, within a cross-section taken along the line B–B' of the afore-mentioned FIG. 1, the semiconductor layer 7 is formed to span the whole hill-shaped section 2a, as shown in FIG. 3. A gate insulating film 8 is then grown to a thickness of 100 nm of so (FIG. 10). In this instance, as the afore-mentioned first interlayer film, the gate insulating film is formed from a $SiO_2$ Film by the PCVD method using TEOS as the material. In total,the film thickness of the inter layer film lying on the top of the hill-shaped section is 200 nm or so, indicating the interlayer film thereon is certainly formed to be thinner than the original total film thickness (900 nm) of the first interlayer film 5 and the gate insulating film 8.

In general, the film thickness of the interlayer film on the top of the hill-shaped section is preferably set to be at least 100 nm in order to avoid short-circuit between the underneath light-shielding film and a metal electrode layer that is to be disposed thereon. As for the maximum, because the first interlayer film is normally formed to have a thickness of 500 nm or greater, a certain effect can be obtained simply by making the interlayer film thereon to have a thickness less than that value, but to attain a higher light-shielding effect, the interlayer film thereon is preferably formed to have a thickness not greater than 300 nm.

Meanwhile, the greater a width of the top of the hill-shaped section is set, the higher the light-shielding effect becomes. Yet, if the top becomes excessively wide, it adversely affects the pixel aperture ratio. Moreover, considering that, within a width (currently 5 $\mu$m or narrower) of a black matrix formed above the TFT, at least both hills of a hill-shaped section are normally contained, and besides an interlayer film lying on a lateral face with respect to a channel width (currently 1 $\mu$m or so) of the semiconductor layer is preferably set at a distance of 500 nm or greater from the underneath light-shielding film, as described above, the maximum value for the bottom width of the hill-shaped section becomes 1.5 $\mu$m so that the top width thereof must be narrower than that. Moreover, as the width of the opening in the resist pattern is normally set to be 1 $\mu$m or so, the top width of the hill-shaped section may be set to be approximately a half or that, that is, 500 nm or so.

After that, to form source-drain regions of an n-ch TFT and a p-ch TFT as well as a LDD region of the n-ch TFT, dopant implantations are performed. Firstly, an implantation of $n^+$ dopants and then an implantation of n dopants are carried out, and, as shown in FIG. 2, a gate line 9 is formed from a material such as WSi. A portion of the gate line is brought out on the channel section of the semiconductor layer 7 and, with p⁺ dopants being implanted, annealing is applied thereto to activate dopants so that it may be made a gate electrode of the TFT. Further, an upper electrode 10 of a storage capacitor section is grown into a prescribed form. Formation of the upper electrode 10 of the storage capacitor section can be, hereat, carried out concurrently with that of the gate line 9 using the same material. Further, if, in formation, a portion of the semiconductor layer 7 is brought out under the upper electrode 10 as a lower electrode of the storage capacitor section, it becomes unnecessary to set another lower electrode separately and, thus, the number of the steps in the manufacturing method can be reduced. In that case, through the implantation of dopants with a high concentration, the semiconductor layer 7 of the storage capacitor section should be made to have a substantially low resistance.

After that, according to the customary method, a data line, a black matrix and an ITO (Indium Tin Oxide) pixel electrode are formed in succession with respective interlayer films being inserted therebetween, whereby fabrication of a TFT substrate is accomplished.

For the currently available TFT that utilizes polysilicon as a semiconductor layer, low temperature polysilicon which can be formed by growing amorphous polysilicon by the low temperature method such as the LPCVD (Low Pressure Chemical vapor Deposition) method and then to turn this to polysilicon, applying laser annealing thereto, has become the one in general use. In the above example, because a polysilicon layer is formed to span the whole hill-shaped section within a cross-section taken along the line B–B' of FIG. 1, if polysilicon is formed by a method of this sort, the application of laser annealing to a slope area of the hill-shaped section may become insufficient, and, in some cases, polysilicon with adequate characteristics cannot be obtained. Accordingly, a structure to allow low temperature polysilicon to be formed satisfactorily by laser annealing is described below.

FIGS. 11–20 are schematic views in explaining the steps of a method of manufacturing a pixel structure in a liquid crystal display device that is the second embodiment of the present invention.

Figure 11A:
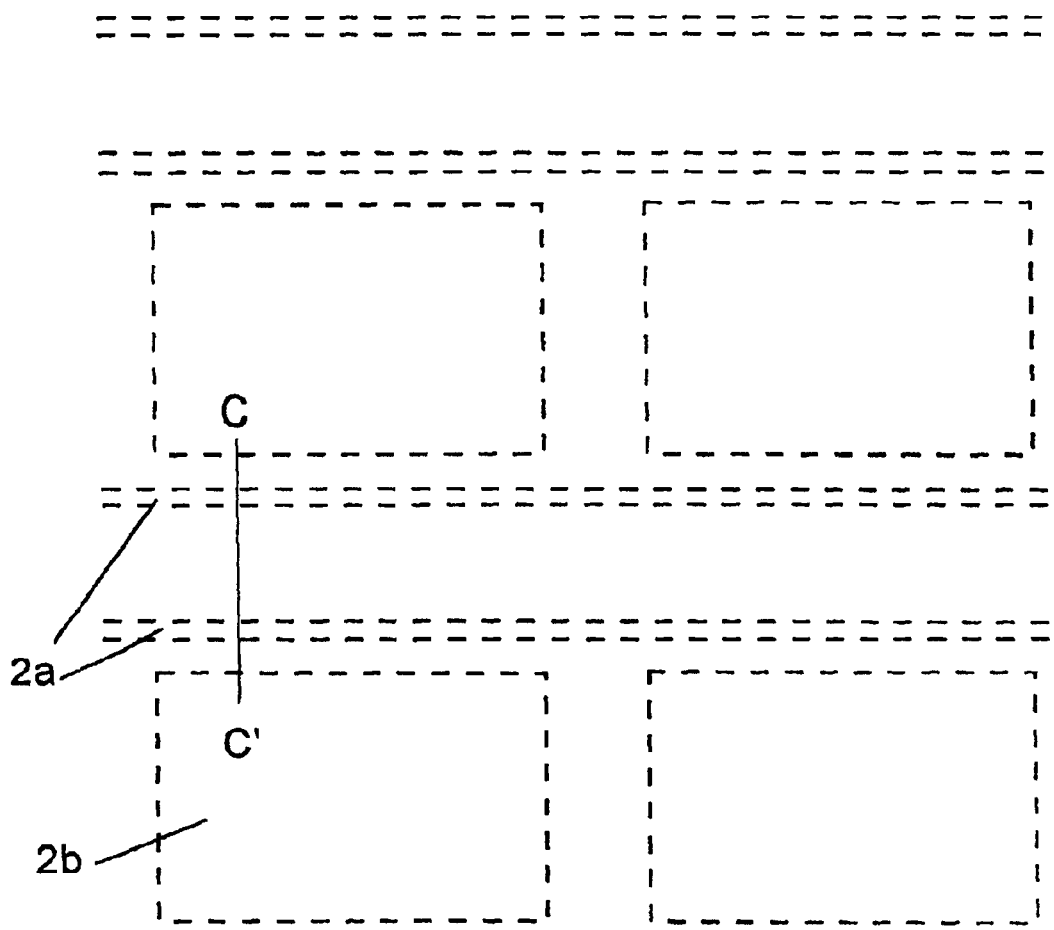
FIG. 11 is a schematic plan view (a) and a schematic cross-sectional view taken along the line C–C' thereof (b) in explaining the steps of a method of manufacturing another pixel structure that is the second embodiment of the present invention.
Figure 11B:
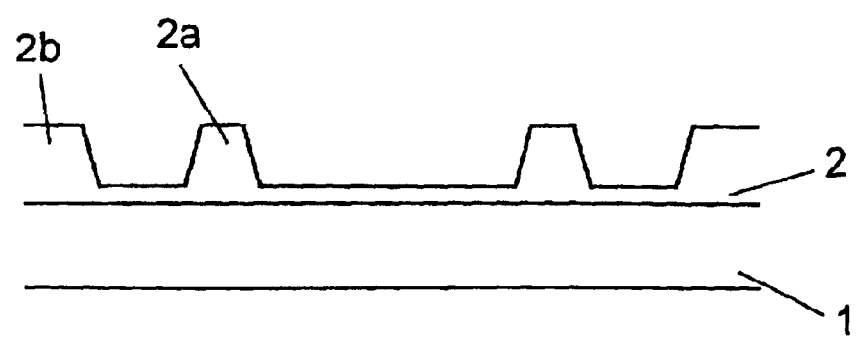

Firstly, in the same way as the above example, on a transparent insulating substrate 1 such as a glass substrate, an underlying insulating film 2 such as SiN is grown and then a resist is disposed in the form of a pattern so that an area on which a semiconductor layer of a TFT is to be formed may be carved therein as a groove. Hereat, a resist is disposed in such a way that the underlying light-shielding film 2 is left between a display pixel region and a TFT region so as to form a hill-shape section 2a. Further, FIG. 11(a) is a plan view and FIG. 11(b) is a cross-sectional view taken along the line C–C' of FIG. 11(a).

Figure 12A:
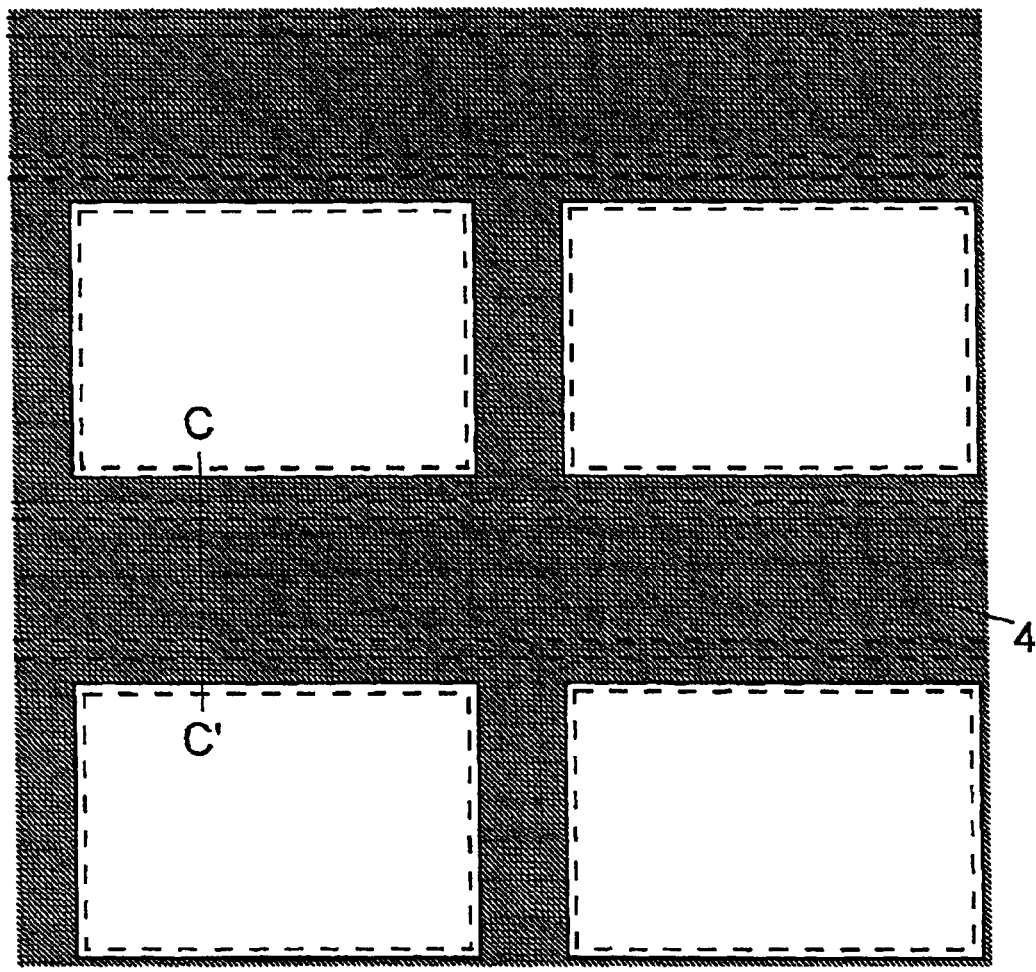
FIG. 12 is a schematic plan view (a) and a schematic cross-sectional view taken along the line C–C' thereof (b) in explaining the steps of the method of manufacturing the pixel structure that is the second embodiment of the present invention.
Figure 12B:
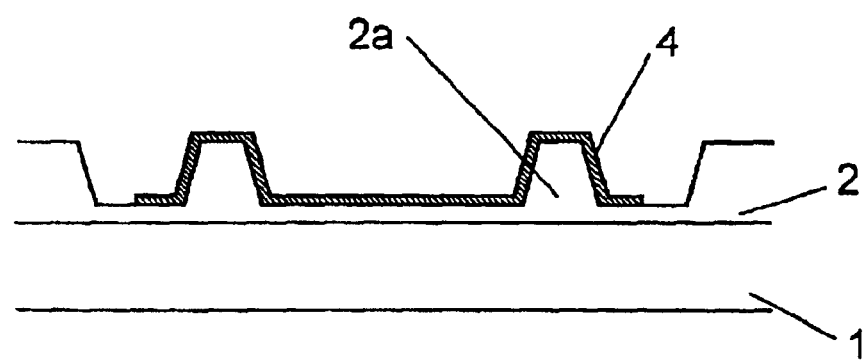

After removing the resist, as shown in FIG. 12, an underneath light-shielding film 4 made of a material such as WSi is applied over the entire surface but the display pixel region.

Figure 13:
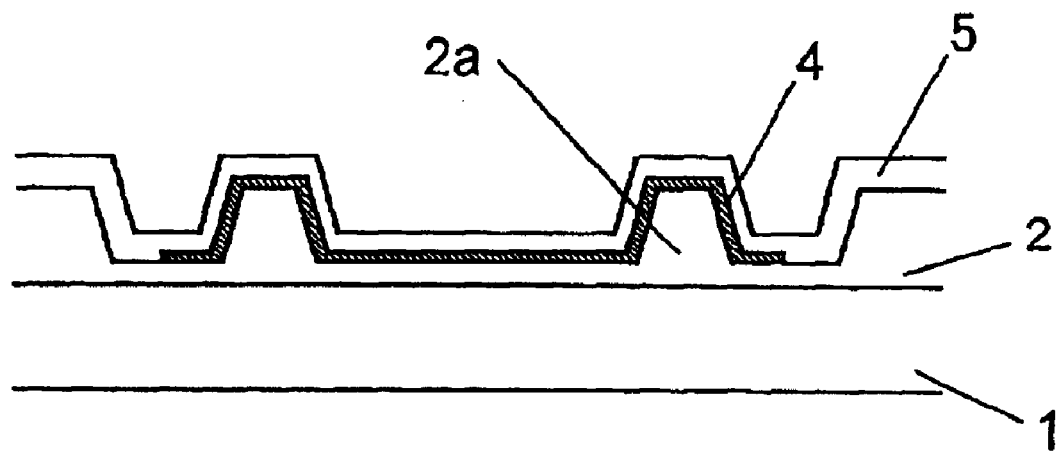
FIG. 13 is a schematic cross-sectional view in explaining the steps of the method of manufacturing the pixel structure that is the second embodiment of the present invention.
Figure 14:
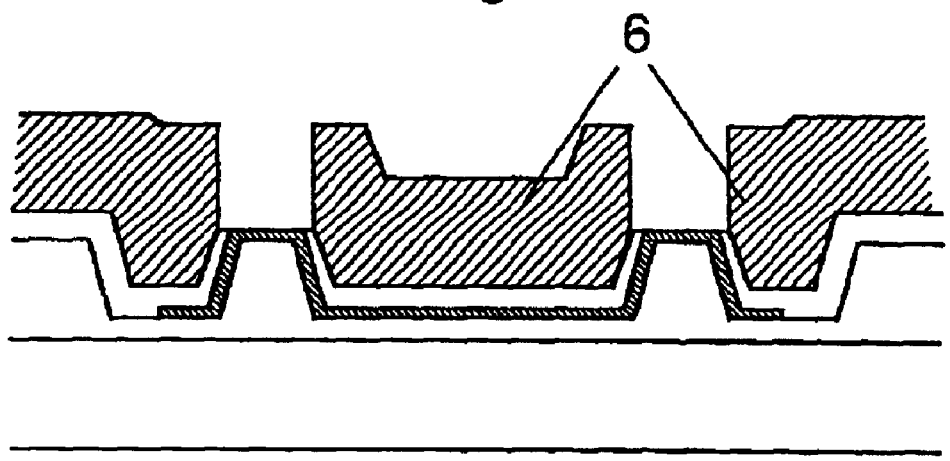
FIG. 14 is a schematic cross-sectional view in explaining the steps of the method of manufacturing the pixel structure that is the second embodiment of the present invention.
Figure 15A:
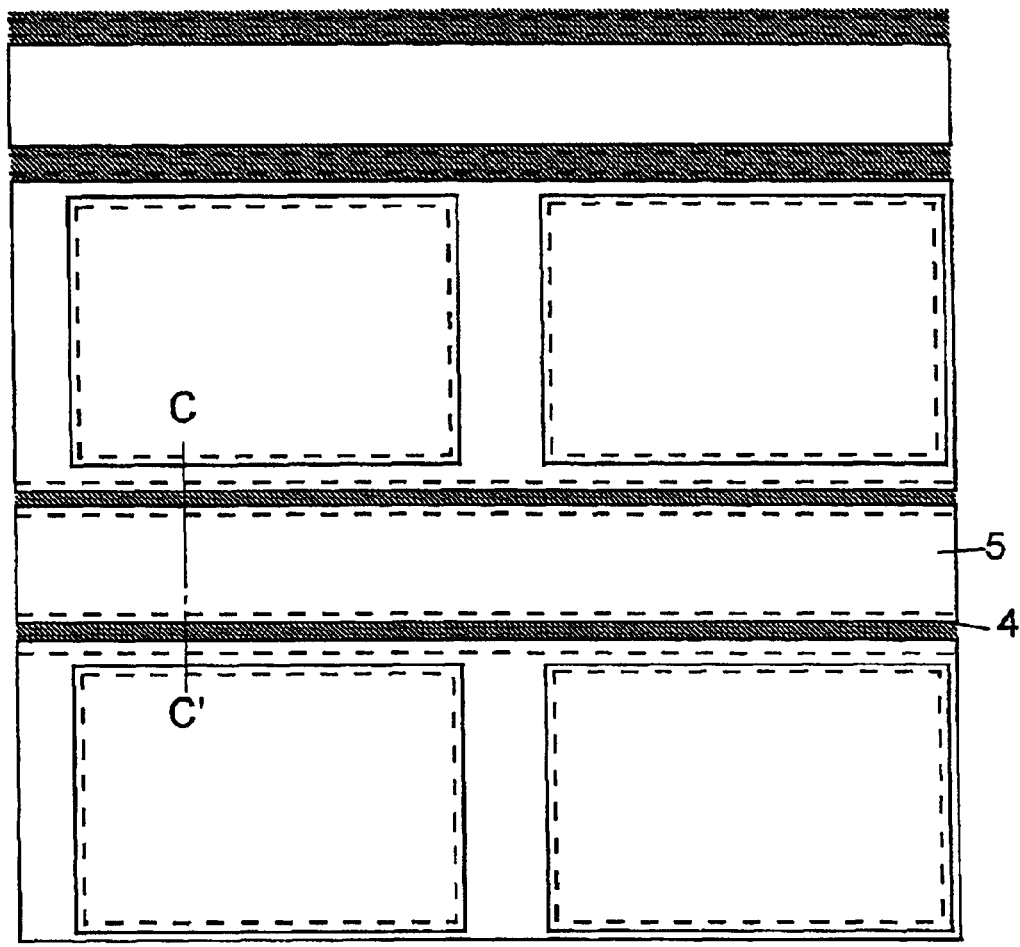
FIG. 15 is a schematic plan view (a) and a schematic cross-sectional view taken along the line C–C', thereof (b) in explaining the steps of the method of manufacturing the pixel structure that is the second embodiment of the present invention.
Figure 15B:
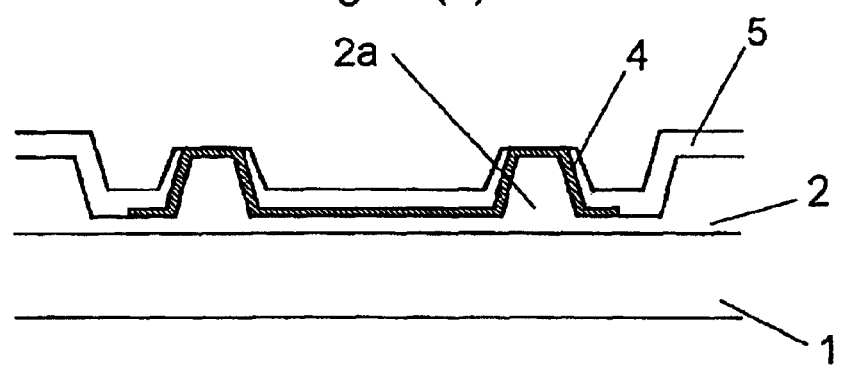
Figure 16A:
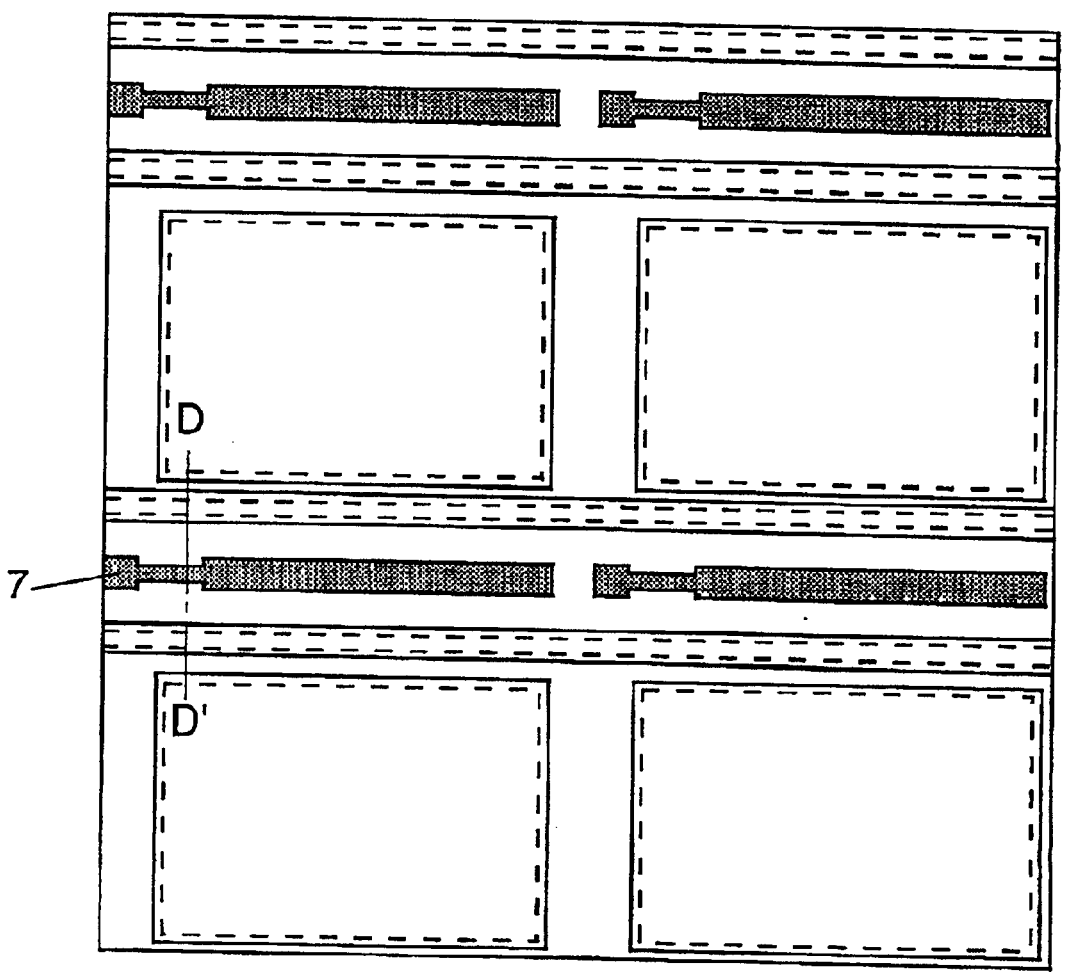
FIG. 16 is a schematic plan view (a) and a schematic cross-sectional view taken along the line D–D' thereof (b) in explaining the steps of the method of manufacturing the pixel structure that is the second embodiment of the present invention.
Figure 16B:
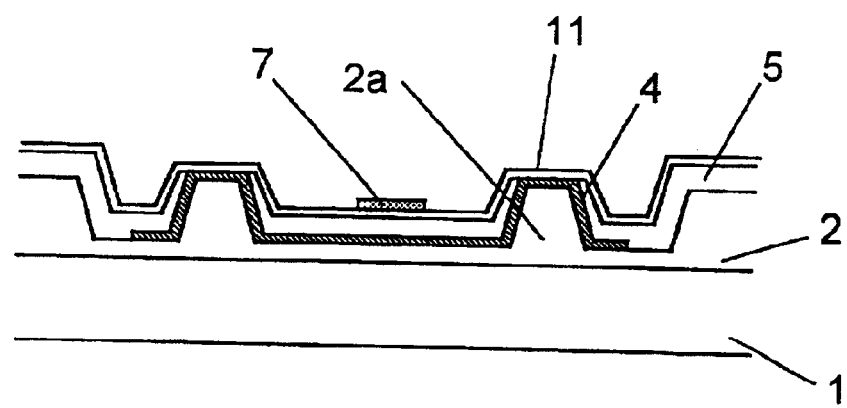
Figure 17A:
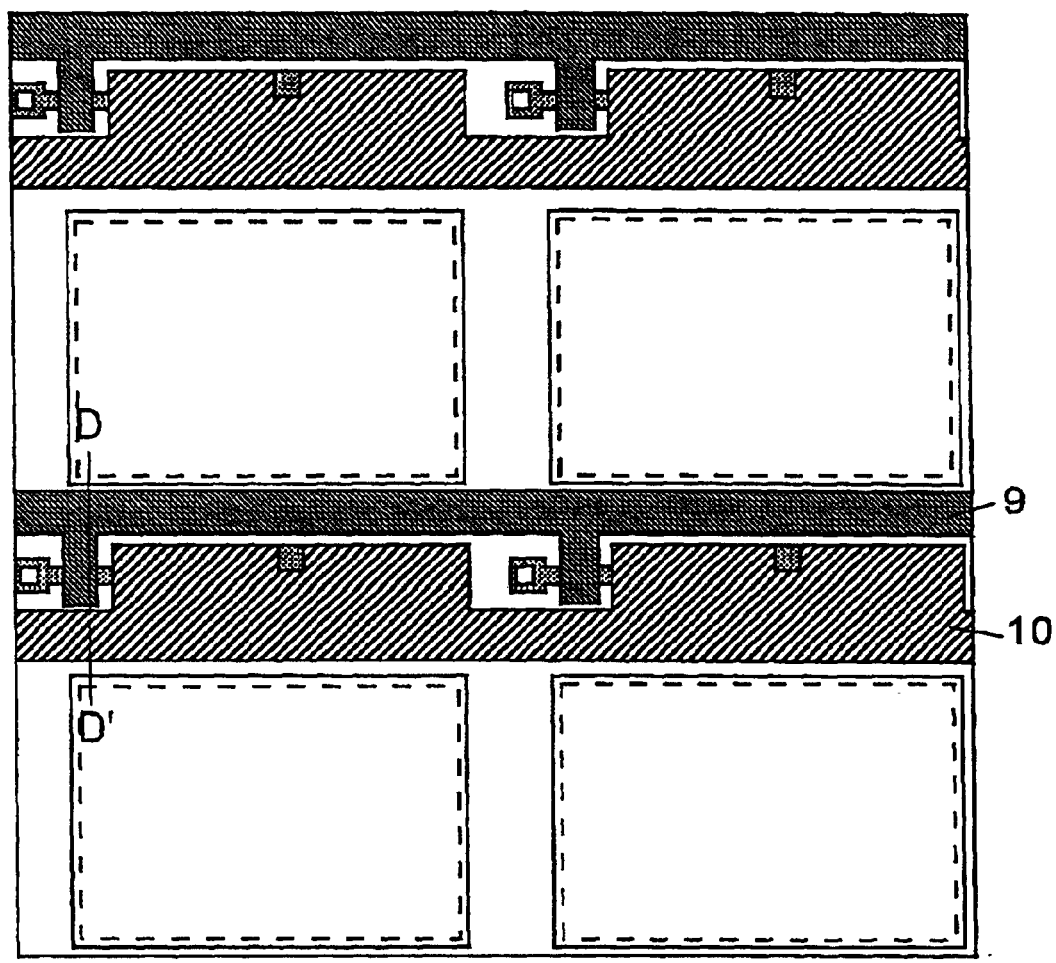
FIG. 17 is a schematic plan view (a) and a schematic cross-sectional view taken along the line D–D' thereof (b) in explaining the steps of the method of manufacturing the pixel structure that is the second embodiment of the present invention.
Figure 17B:
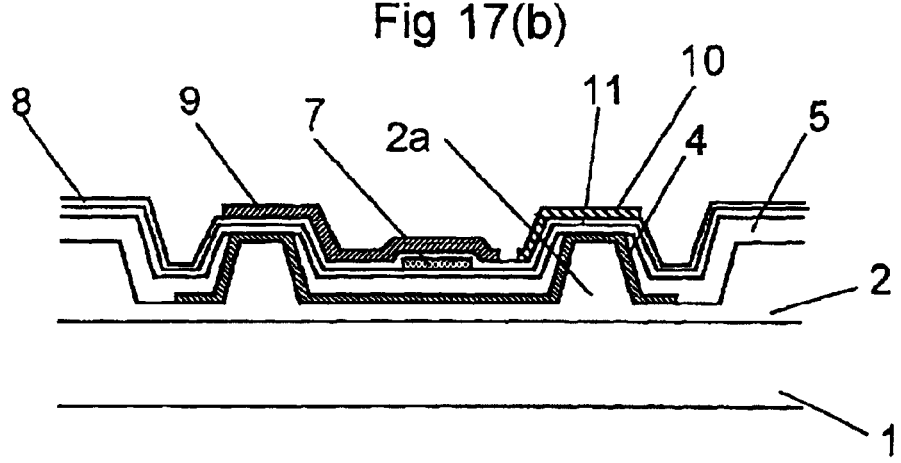

Following that, as shown in FIG. 13, after a first interlayer film 5 is grown to a prescribed thickness, a resist 6 is disposed so as to expose only a portion of the first interlayer film lying on the top of the hill-shaped section and then the exposed portion of the first interlayer film 5 is removed by means of etching (FIG. 14). While, in the above example, the etching time period is adjusted to deliberately leave the first interlayer film 5 thinly, in this case, etching continues until the underneath light-shielding film 4 is exposed. FIGS. 15(a) and (b) are a schematic plan view and its partial cross-sectional view, respectively, both showing the state after the resist 6 is removed.

Next, after a second interlayer film 11 with a thickness of 100 nm or so is grown over the entire surface of the substrate in the same way as the afore-mentioned first interlayer film, in order to form a semiconductor layer 7 of polysilicon that is to constitute a channel section of the TFT, an amorphous silicon layer is grown by the LPCVD method and then turned into polysilicon by applying laser annealing thereto. Hereat, amorphous silicon is grown using silane as a material and then turned into polysilicon by applying an irradiation with an intensity of 400 mJ by excimer laser at room temperature. After that, polysilicon is patterned into a prescribed form by means of photolithography. Hereat, the semiconductor layer 7 is formed, elongating on the side of a source section, a part of which is then used for a capacitor (FIGS. 16(a), (b)).

Next, a gate insulating film 8 is grown so as to cover the semiconductor layer 7 on the substrate and then, in order to form source-drain regions of an n-ch TFT, n⁺ dopants are implanted and thereafter a gate line 9 is grown on the gate insulating film 8. Hereat, using WSi, a film is grown and, subsequently, the film is patterned into a prescribed form by means of photolithography. In forming the gate line, a portion thereof is brought out to cover a channel region of the semiconductor layer 7 and this portion is to serve as a gate electrode. This is followed by an implantation of n⁻ dopants to form a LDD region of the n-ch TFT, and an implantation of p⁺ dopants to form source-drain regions of a p-ch TFT and a subsequent annealing for activation of the dopants. An upper electrode 10 of a capacitor section is then grown into a prescribed form. This results in the structure shown in FIGS. 17(a) and (b). Further, to lower the electric resistance, an implantation of n⁺ dopants to the semiconductor layer of the storage capacitor section is also carried out. The implantation of n⁻ dopants herein can be also made prior to formation of the gate metal.

Figure 18A:
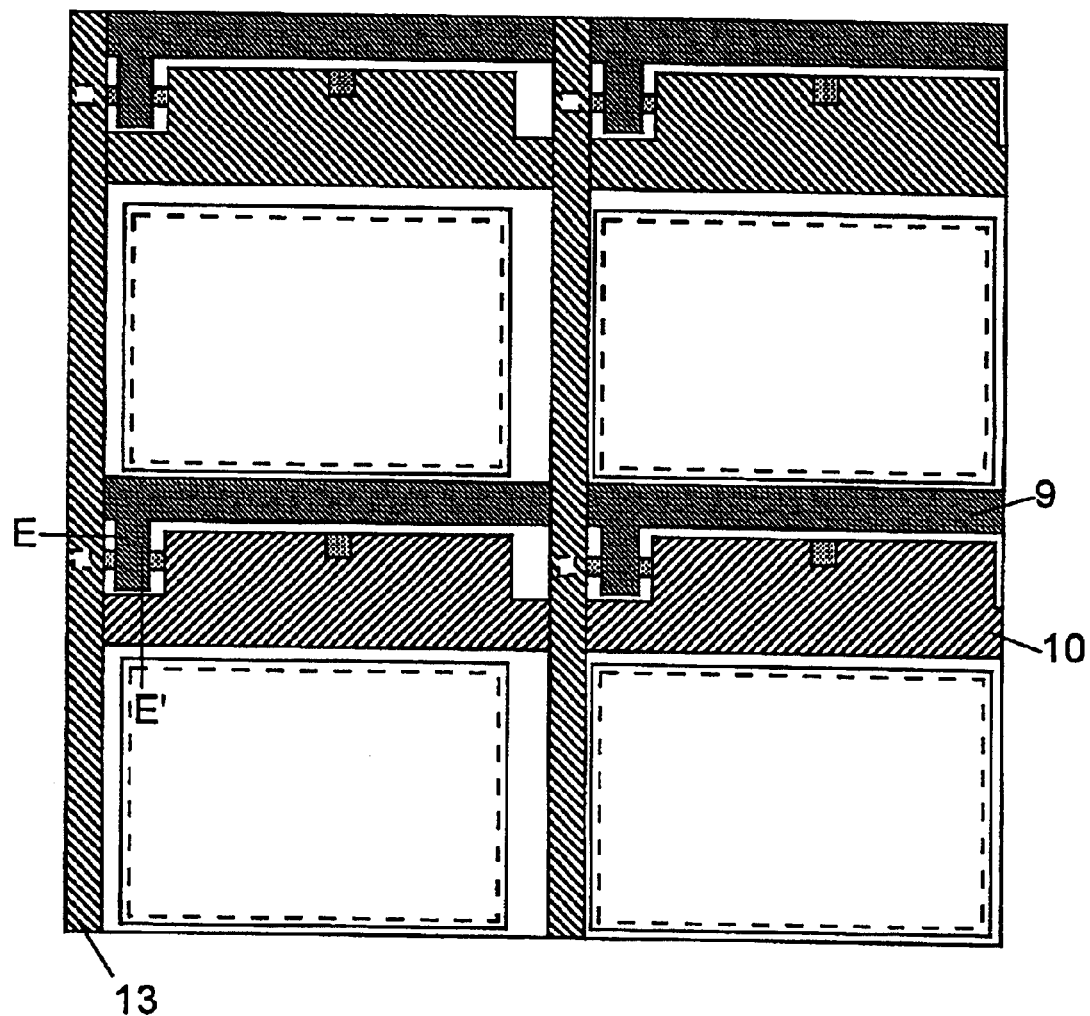
FIG. 18 is a schematic plan view (a) and a schematic cross-sectional view taken along the line E–E' thereof (b) in explaining the steps of the method of manufacturing the pixel structure that is the second embodiment of the present invention.
Figure 18B:
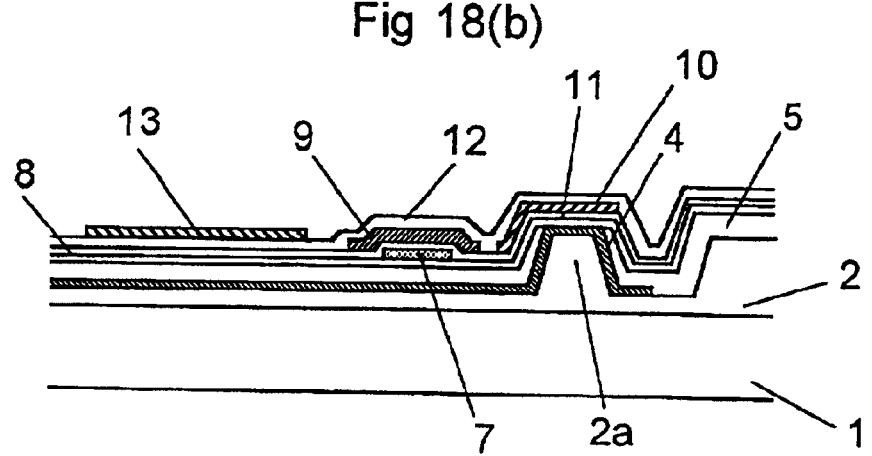
Figure 19A:
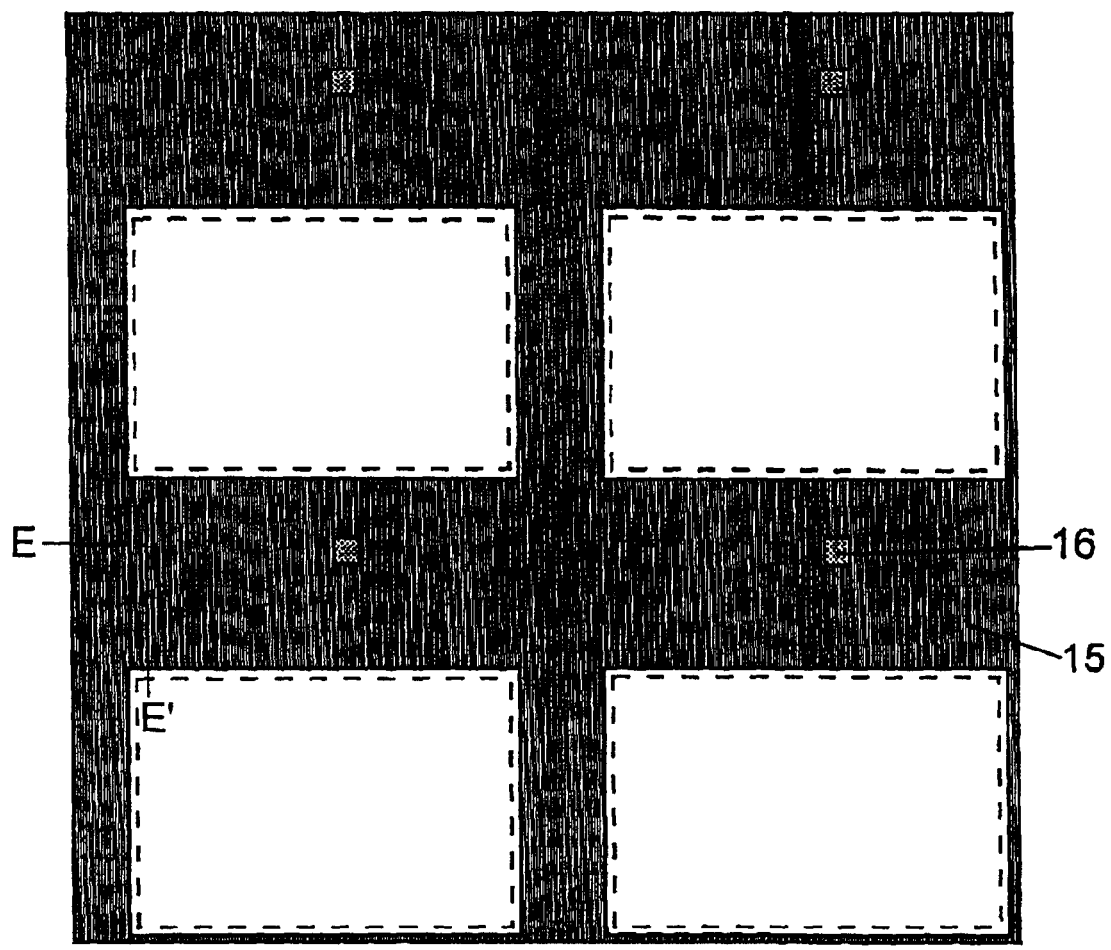
FIG. 19 is a schematic plan view (a) and a schematic cross-sectional view taken along the line E–E' thereof (b) in explaining the steps of the method of manufacturing the pixel structure that is the second embodiment of the present invention.
Figure 19B:
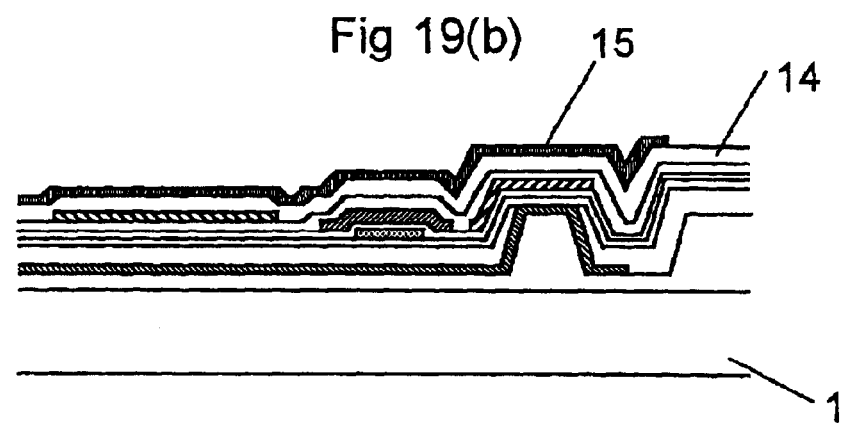

Next, as shown in FIGS. 18(a) and (b), after a third interlayer film 12 of, for example, a SiO₂ film is grown in the same way as described above, there is formed, from a metal material such as aluminum, a data line, together with a contact section for a drain (or a source) region of the TFT associated therewith. Next, as shown in FIGS. 19(a) and (b), after a fourth interlayer film 14 of, for example, a SiN film is grown by the CVD method a black matrix 15 having a pixel opening section as well as an opening for a contact section 16 with a source (or a drain) region of the TFT is formed to a thickness of 400 nm or so from a metal material such as aluminum.

Figure 20A:
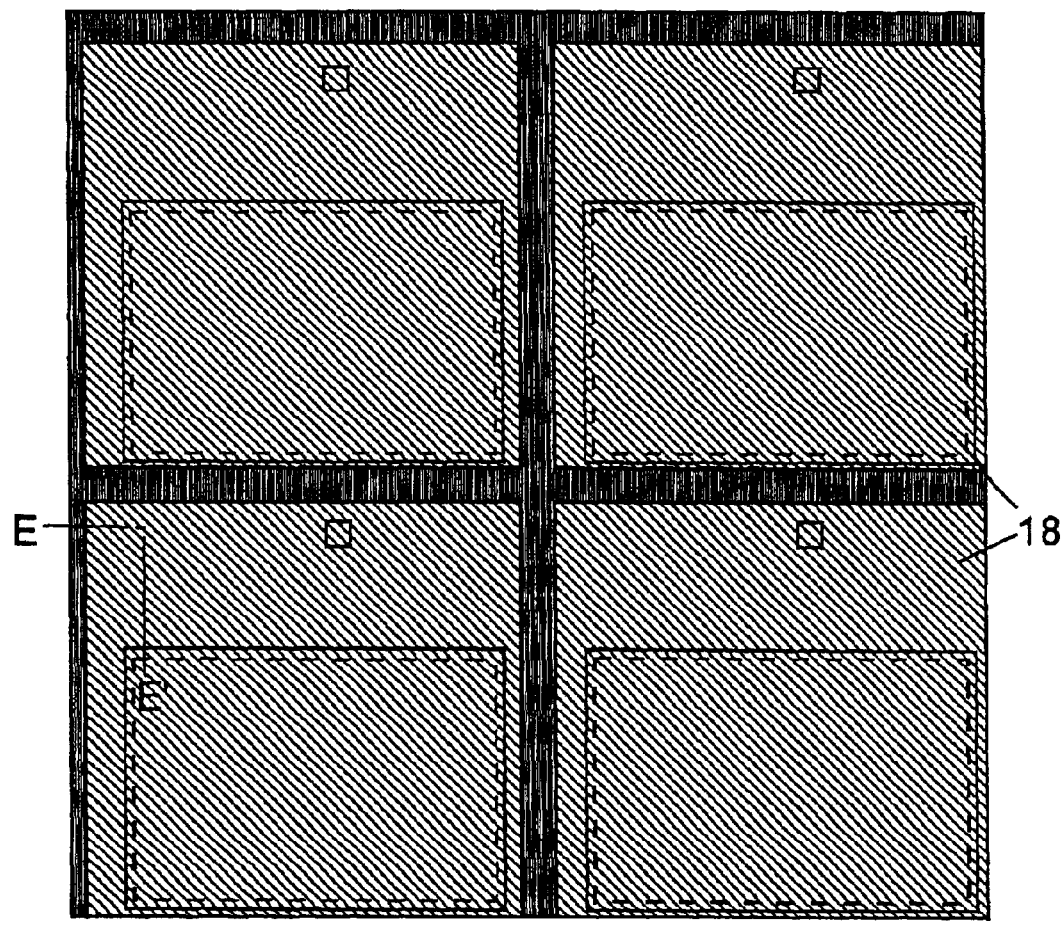
FIG. 20 is a schematic plan view (a) and a schematic cross-sectional view taken along the line E–E' thereof (b) in explaining the steps of the method of manufacturing the pixel structure that is the second embodiment of the present invention.
Figure 20B:
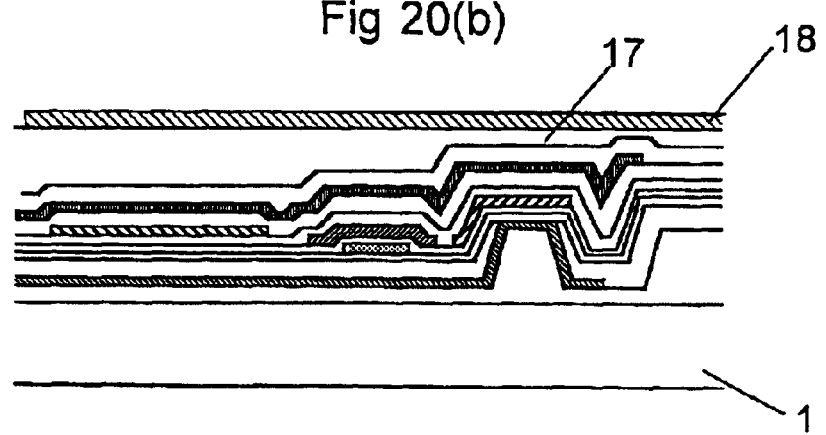

Finally, as shown in FIGS. 20(a) and (b), after the substrate surface is planarized by growing a film 17 (referred as "planarizing film") to a thickness of 0.5 μm or so with, for example, a resin material such as polyimide, an ITO film 18 that is to serve as a pixel electrode is grown by the sputtering method or the like, whereby fabrication of a TFT substrate is accomplished.

Further, on the surface of the ITO film 18, a sputtering SiO₂ film is grown to a thickness of 50 nm or so, as a passivation film. Subsequently, applications of other treatments such as terminal etching, backside etching and the like thereto, sticking of an opposite substrate therewith by a well-known method, and an injection of a liquid crystal between these substrates accomplish fabrication of a liquid crystal panel.

This arrangement in structure enables the semiconductor layer to be formed without any stepped part so that low temperature polysilicon formed by laser annealing can attain high quality.

Figure 21:
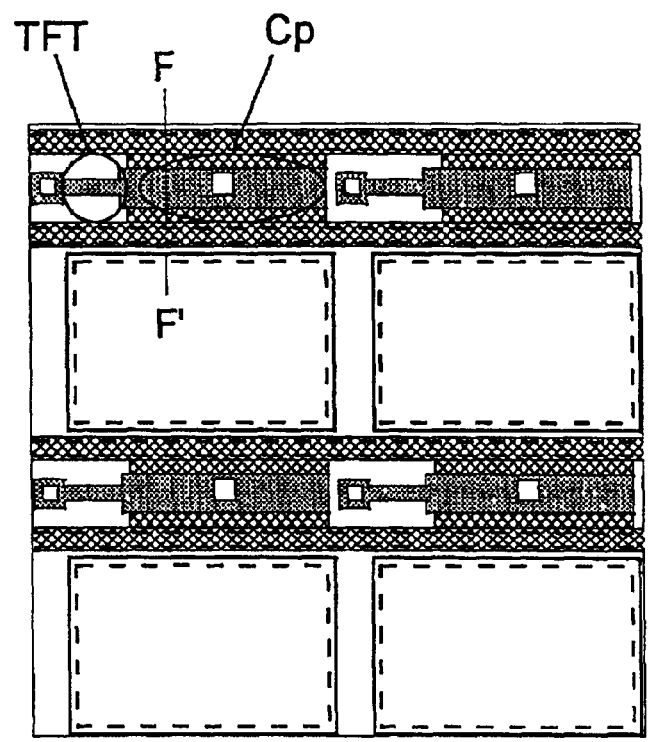
FIG. 21 is a schematic plan view in explaining the steps of a method of manufacturing another pixel structure that is the third embodiment of the present invention.

As described above, while every TFT has an adjacent capacitor section, the present invention can provide an arrangement in structure capable to store electric charge in a large amount. Referring to a drawing, such a structure that is the third embodiment of the present invention is described below. FIG. 21 is a schematic plan view in explaining the structure, which illustrates the structure at the stage where formation of a semiconductor layer is completed.

In short, while, in two embodiments described above, a first interlayer film formed on the top of a hill-shaped section is etched away partially in the direction of the thickness to make it thin, in the present embodiment, etching is also applied to a storage capacitor section concurrently to make a first interlayer film 5 lying therein thin and thereby a distance between an underneath light-shielding film 4 and a semiconductor layer 7 may be formed short. As a result, in addition to a storage capacitor composed of the semiconductor layer and an upper electrode 10 of a capacitor section, another storage capacitor is formed with the underneath light-shielding film and the semiconductor layer and, thus, a value of storable electric charge capacitance increases. Hatched areas in FIG. 21 represent parts wherein the first interlayer film is thinned.

Figure 22:
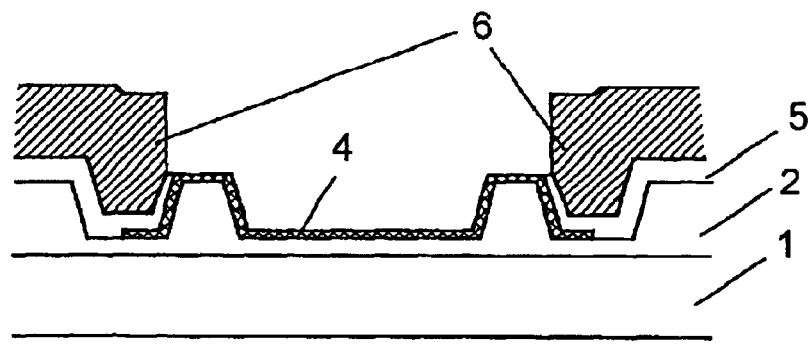
FIG. 22 is a schematic cross-sectional view taken along the line F–F' in FIG. 21 in explaining the steps of the method of manufacturing the pixel structure that is the third embodiment of the present invention.
Figure 23:
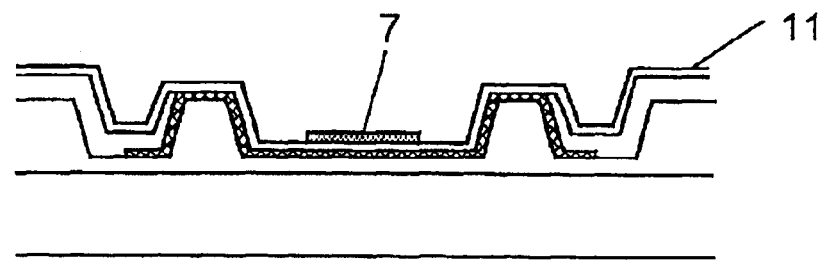
FIG. 23 is a schematic cross-sectional view taken along the line F–F' in FIG. 21 in explaining the steps of the method of manufacturing the pixel structure that is the third embodiment of the present invention.
Figure 24:
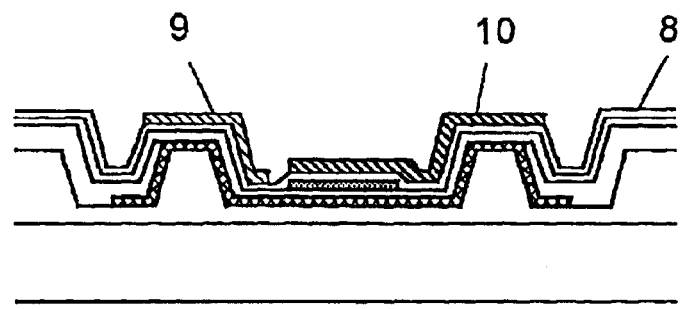
FIG. 24 is a schematic cross-sectional view taken along the line F–F' in FIG. 21 in explaining the steps of the method of manufacturing the pixel structure that is the third embodiment of the present invention.
Figure 25A:
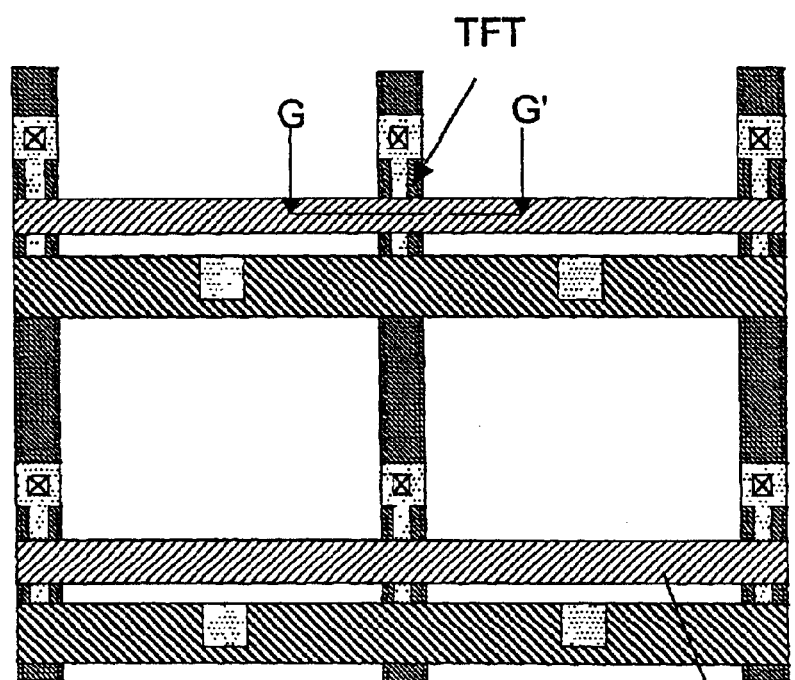
FIG. 25 is a schematic plan view (a) and a schematic cross-sectional view taken along the line G–G' thereof (b) in explaining the conventional pixel structure.
Figure 25B:
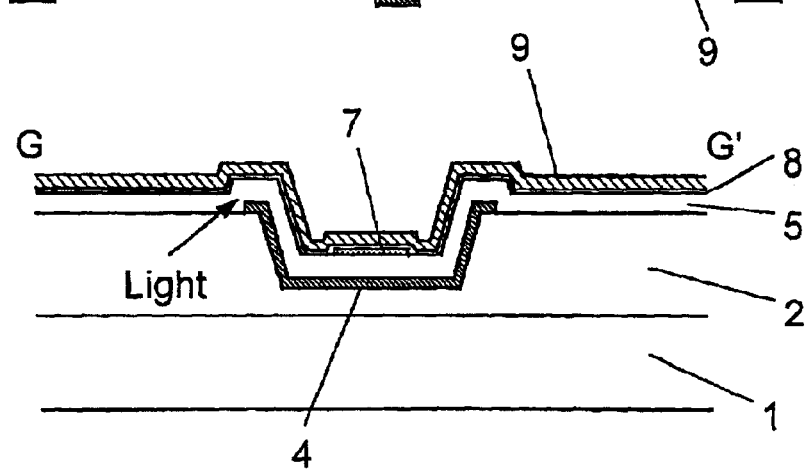

With reference to FIG. 22–FIG. 24, each showing a cross-section taken along the line F–F' of FIG. 21, a manufacturing method of this structure is described below. The description herein relates to an improvement made on the storage capacitor section of the second embodiment but a similar improvement can be also made for the first embodiment.

In the same way as described above, after an underlying insulating film 2 is formed on a glass substrate 1, a groove is formed in such a way that a hill-shaped section is left on either side of a region where a semiconductor layer is to be formed and thereafter an underneath light-shielding film 4 and a first interlayer film 5 are laid similarly. Subsequently, when a portion of the first interlayer film 5 lying on the hill-shaped section is etched, etching is also applied to a storage capacitor section without forming a resist 6 thereon so that an area inside of the groove placed between a pair of hill-shaped sections may be concurrently etched to expose the underneath light-shielding film 4 (FIG. 22).

Following that, after a thin second interlayer film 11 is grown in the same way as described above, a semiconductor layer 7 is formed (FIG. 23). A gate insulating film 8 is then formed, and thereafter a gate line 9 is formed to reach the top of one of the hill-shaped section and an upper electrode 10, the top of the other (FIG. 24). Compared with the cross-sectional view of the afore-mentioned FIG. 17(*b*), the thickness of the insulating film laid between the underneath light-shielding film 4 and the semiconductor layer 7 is reduced and, as a result, this section can function as a storage capacitor, facilitating an increase in capacitance.

What is claimed is:

1. An active matrix type liquid crystal display device having a structure in which a pixel TFT is disposed in a trench in a substrate, wherein a hill-shaped section encloses at least two sides of the TFT, wherein an underneath light-shielding film is disposed beneath a semiconductor layer of the TFT so as to reach at least a top of said hill-shaped section and a metal electrode layer formed above the semiconductor layer of the TFT extends to the top of said hill-shaped section, wherein on the top of said hill-shaped section, a film thickness of an interlayer insulating film between said underneath light-shielding film and metal electrode layer is thinner than in other sections thereof, and wherein a portion of said semiconductor layer of the TFT constitutes a storage capacitor section and the interlayer film laid between the semiconductor layer and the underneath light-shielding film in said storage capacitor section is made thinner than in the TFT section.

2. A liquid crystal display device according to claim 1, wherein the interlayer insulating film between said underneath light-shielding film and metal electrode layer comprises a first interlayer film between the underneath light-shielding film and the semiconductor layer as well as a gate insulating film between the semiconductor layer and the metal electrode layer and, on the top of said hill-shaped section, at least a part of said first interlayer film in the direction of the thickness is absent.

3. An active matrix liquid crystal display device comprising:

a layer of first insulating material having at least two spaced-apart ridges thereon;

a light shielding film on said first insulating material and extending between and to tops of said at least two ridges;

a layer of second insulating material on said light shielding film, said layer of second insulating material having a first thickness between said at least two ridges and a second thickness less than the first thickness at the tops of said at least two ridges, whereby a light path through said layer of second insulating material is constricted by the second thickness;

a pixel thin film transistor (TFT) on said layer of second insulating material between said at least two ridges; and a metal electrode over said TFT and extending between and to the tops of said at least two ridges.

4. The device of claim 3, comprising four of said ridges that enclose said TFT.

5. The device of claim 3, wherein said metal electrode is a gate electrode and further comprising a gate insulating film beneath said gate electrode.

* * * * *